(12) United States Patent
Kolpasky et al.

(10) Patent No.: US 7,758,092 B2
(45) Date of Patent: Jul. 20, 2010

(54) COVER HAVING COLLAPSIBLE STORAGE BINS

(75) Inventors: Kevin G. Kolpasky, Oakland Township, MI (US); Joseph M. Polewarczyk, Rochester Hills, MI (US); Jan H. Aase, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/142,837

(22) Filed: Jun. 20, 2008

(65) Prior Publication Data

US 2009/0315358 A1 Dec. 24, 2009

(51) Int. Cl.
*B60P 7/04* (2006.01)
(52) U.S. Cl. .................. 296/37.5; 296/37.6; 296/24.43
(58) Field of Classification Search .............. 296/37.1, 296/37.5, 37.6, 37.16, 24.4, 24.43, 24.44, 296/98, 100.01, 136.03; 160/84.01, 84.06, 160/370.22, 323.1; 224/311, 314, 275
See application file for complete search history.

(56) References Cited

U.S. PATENT DOCUMENTS

| | | | | | |
|---|---|---|---|---|---|
| 5,336,124 | A | * | 8/1994 | Garside | 452/125 |
| 5,484,091 | A | * | 1/1996 | Malinowski et al. | 224/542 |
| 5,743,589 | A | * | 4/1998 | Felker | 296/180.5 |
| 6,254,162 | B1 | * | 7/2001 | Faber et al. | 296/39.2 |
| 6,682,118 | B2 | * | 1/2004 | Ryan | 296/39.1 |
| 6,719,347 | B2 | * | 4/2004 | Gehring et al. | 296/37.5 |
| 6,832,799 | B2 | * | 12/2004 | Haspel et al. | 296/37.16 |
| 6,874,667 | B2 | * | 4/2005 | Dykstra et al. | 224/498 |
| 6,942,270 | B1 | * | 9/2005 | Mulvihill | 296/37.16 |
| 7,438,338 | B1 | * | 10/2008 | Schumacher et al. | 296/37.6 |
| 2009/0167043 | A1 | * | 7/2009 | Aebker | 296/37.16 |

* cited by examiner

*Primary Examiner*—Glenn Dayoan
*Assistant Examiner*—Gregory Blankenship

(57) ABSTRACT

A cover configured to overlay a space and secure at least one item, includes selectively collapsible storage bins, and preferably includes a retraction mechanism operable to stow the cover, and a guide for automatically causing the bins to collapse as the cover is stowed.

15 Claims, 4 Drawing Sheets

COVER HAVING COLLAPSIBLE STORAGE BINS

BACKGROUND OF THE INVENTION

1. Technical Field

The present invention relates to covers and storage containers, and more particularly, to a cover defining selectively collapsible storage bins.

2. Discussion of Prior Art

A variety of covers have long been developed to serve as barriers or protect against undesirable conditions, such as, rain, snow, or direct exposure to solar radiation. In an automotive setting, for example, cargo shades and bed covers are often used to protect items stored in the bed of a pickup truck or the cargo/storage area of a vehicle. These covers are typically deployed manually or automatically, by placing upon and fastening the cover (and frame) to the bed rails, tilting/swinging a hinged cover relative to the space, or unwinding/rolling a soft cover from a retraction mechanism. The covers are then stowed by unfastening and removing the cover, reversibly tilting/swinging the cover, or retracting the cover with the mechanism.

Besides the formation of a protective barrier, however, conventional covers typically provide no further benefit to the user. For example, covers, such as the afore-mentioned cargo shades and bed covers, offer items (e.g., groceries, supplies, tools, etc.) stored in a truck bed or the cargo/storage area of an enclosed vehicle no further security. These items are often left free to jostle, are subject to agitation and reorientation, and as a result, may become damaged during a vehicle trip, even when a conventional shade is deployed. Moreover, for certain items such as grocery bags and purses, the unwanted spillage of things carried thereby is a common nuisance experienced by drivers.

Cargo nets, tie downs, bed dividers and other similar devices have been recently developed to secure items hauled in truck beds and cargo areas; but these measures fail to provide the protective barrier of a cover.

BRIEF SUMMARY

The present invention presents a cover configured to overlay/protect a space and simultaneously secure at least one item within the space. The inventive cover includes at least one collapsible storage bin configured to retain the items in a secure position within the space. Among other things, the cover, when used in an automotive setting, is useful for preventing the undesirable jostling, agitation and reorientation of items, such as grocery bags and purses, during a vehicle trip. Thus, the invention is further useful for preventing the unwanted spillage of things carried by these items. The bins are modifiable between collapsed and extended conditions, so as to facilitate use of the cover in a conventional manner, and storage of the cover when not in use. Finally, the invention is further useful for providing an automatic means for collapsing the bins, as the cover is stowed by a retraction mechanism.

More particularly, the present invention presents a cover employable to protect a space and secure at least one item. The cover is formed by at least one planar sheet presenting a minimum lateral surface area operable to overlay the space, and includes at least one storage bin securely connected to or integrally formed with said at least one sheet. The bin is modifiable between a collapsed condition, wherein the bin is withdrawn from the space, and an extended condition, wherein the bin extends within the space and forms a container configured to retain the item.

Further inventive aspects of the cover involving modes of automatic retraction, variable bin configurations, and exemplary applications are also presented herein. The above described and other features are exemplified by the following figures and detailed description.

BRIEF DESCRIPTION OF THE DRAWINGS

Preferred embodiments of the invention are described in detail below with reference to the attached drawing figures, wherein.

DETAILED DESCRIPTION

Figure 1:
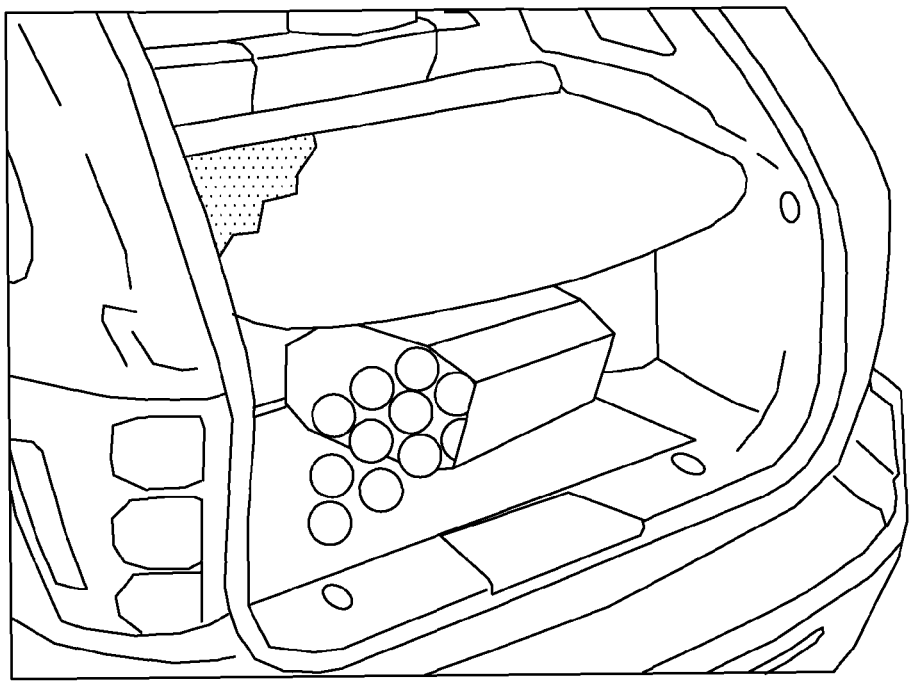
FIG. 1 is a perspective view of a prior art cargo shade in use with a vehicle defining a rear cargo space.

Referring to FIGS. 2-5, the present invention concerns a cover 10 dually employable to protect a space 12 of predetermined dimension, and to secure at least one item 14. The cover 10 is described and illustrated herein with respect to automotive application (e.g., a truck bed, rear cargo area, or instrument panel/interior compartment); however, it is appreciated by those of ordinary skill in the art that the inventive aspects and benefits of the invention may be used in conjunction with other host carriers, such as play pens, serving trays, tables, countertops, patio furniture, baby stroller and pool covers. As used herein, the term "cover" is not limited to the illustrated embodiments, and shall include cargo shades, truck bed covers, Tonneau covers (e.g., hard, hinged, retractable, folding, and soft roll-up), storage and well/bin cover, partitions (e.g., screening, security, protective, and privacy), lids, barriers (e.g., sound, thermal, light, fluid (e.g., moisture, gas, liquid), and/or weather), and the like.

The cover 10 includes a rigid or soft planar sheet 16 presenting a minimum lateral surface area operable to overlay the space 12. The outer edges of the sheet 16 define a cover perimeter and a cover thickness. The sheet 16 is formed of suitable material, such as hard plastics, metal, wood, and synthetic or natural fabrics. Depending upon the type of protection desired, the sheet 16 may be permeable, or form a continuous solid barrier. The cover 10 preferably presents a continuous sheet 16 that unwinds from a retraction mechanism 18 of the type defining an opening/orifice 20 and including a scroll (not shown) about which the cover 10 is stored and unwound.

Alternatively, the cover 10 may be a composite of plural sheets 16 or sub-sections. In an automotive setting, for example, the cover 10 may consists of a plurality of rectangular boards 16 adjacently secured along their long sides, so as to cooperatively present a suitable longitudinal cover length.

The space 12 and cover 10 are cooperatively configured so as to provide complete protection without overlap. For example, the cover 10 may present a lid matching the circumference of an open top container, a truck bed cover matching the width and length of the truck bed, or a cargo shade presenting a width congruent to the width of the rear cargo space, as shown in FIG. 2.

A novel aspect of the cover 10 is presented by at least one, and more preferably, a plurality of collapsible storage bins 22 securely connected to or defined by the sheet 16. That is to say, the bins 22 may be separately connected to the sheet 16 (e.g., by snaps, zipper, hook/loop strips, screws, nut/bolts, pins, or otherwise fastener), or may present an integral structure with the sheet 16, wherein a remainder section 24 of the sheet is further defined. The bins 22 each present a bottom panel 26 and a collapsible wall 28 interconnecting the bottom panel 26 and sheet 16. Each bin 22 is selectively, either through manual or automatic means, modifiable between a collapsed condition, wherein the bin 22 is withdrawn from the space 12, and an extended condition, wherein the bin 22 extends within the space 12 and forms a container configured to retain the item(s) 14.

Figure 5:
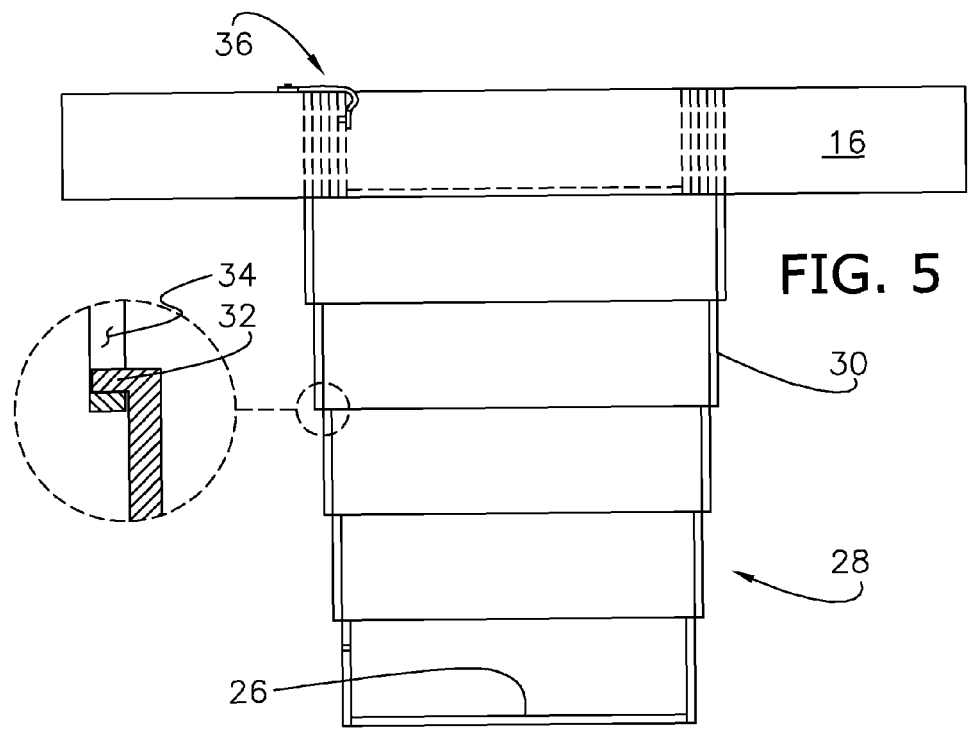
FIG. 5 is a elevational view of a bin having telescoping bin wall sections, in accordance with a preferred embodiment of the invention.

The preferred bin 22 is conveniently sized so as to laterally secure and retain large items 14, such as standard size grocery bags (in a rear cargo or truck bed application) and purses (in an instrument panel application), and as such presents a minimum volume correlated to the intended items of storage. For example, each bin 22 may present a minimum volume not less than 0.01 cubic meters (i.e., aprx. one half cubic foot), and more preferably, not less than 0.02 cubic meters (i.e., aprx. one cubic foot). Finally, it is appreciated that the bins 22 may be retained in the retracted condition, so that the cover 10 may be used conventionally. To that end, a securing element 30, such as the rotatable snap and strand shown in FIG. 5, is preferably provided to hold the bin 22 in the collapsed condition.

Figure 2:
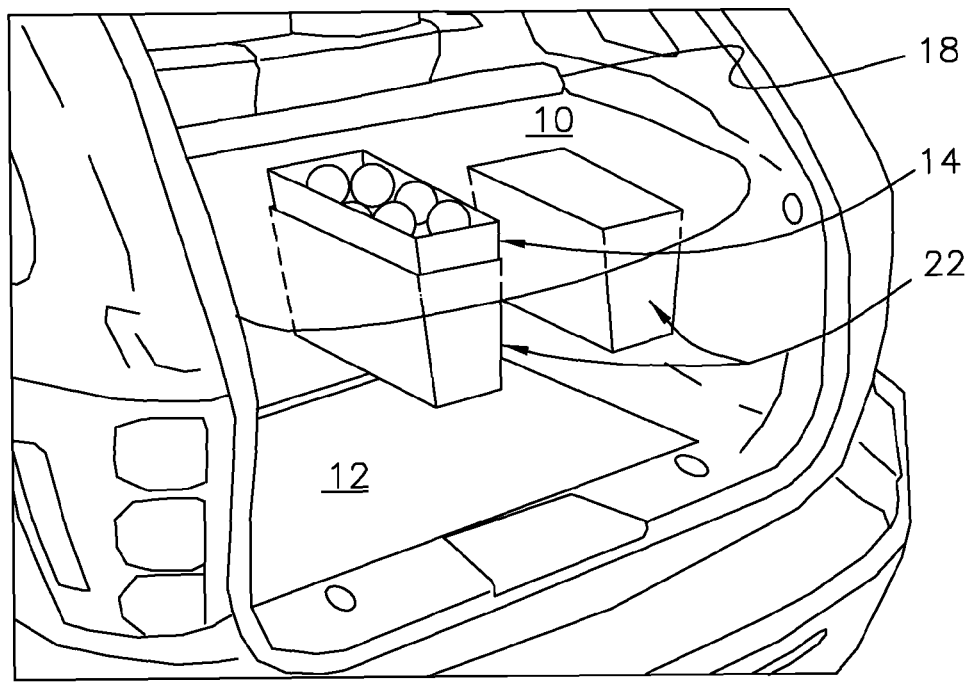
FIG. 2 is a perspective view of a rear cargo space defined by a vehicle and overlaid by a cargo shade having a plurality of collapsible storage bins, in accordance with a preferred embodiment of the invention.

As shown in FIG. 2, the bins 22 are preferably spaced from the cover perimeter, so as to facilitate the placement and securing of the cover 10 to the host carrier (e.g., truck bed, etc.). For example, as is known in the art, the cover 10 may further include a frame (not shown), and a plurality of snaps or latches for inter-engaging the frame and truck bed rails/tie downs.

Each bin 22 preferably defines a thickness equal to the cover thickness in the collapsed condition, so as to facilitate stowage of the cover 10 and storage of non-secured objects within the space 12, when the cover 10 is conventionally deployed. In the collapsed condition, the bottom panel 26 and sheet 16 preferably define a continuous bottom surface. Thus, each bin 22 is preferably attached/connected to the sheet 16 at the top surface, and then otherwise spaced therefrom a sufficient distance to provide a recess for the collapsed wall 28.

In the extended condition, the preferred bins 22 are cooperatively configured with the space 12 such that the maximum bin depth is not greater than the depth of the space 12, and more preferably not greater than seventy-five percent of the depth. For example, where the space 12 is defined by a truck bed having a constant bed depth, the bins 22 preferably present maximum depths not greater than the bed depth.

Figure 3:
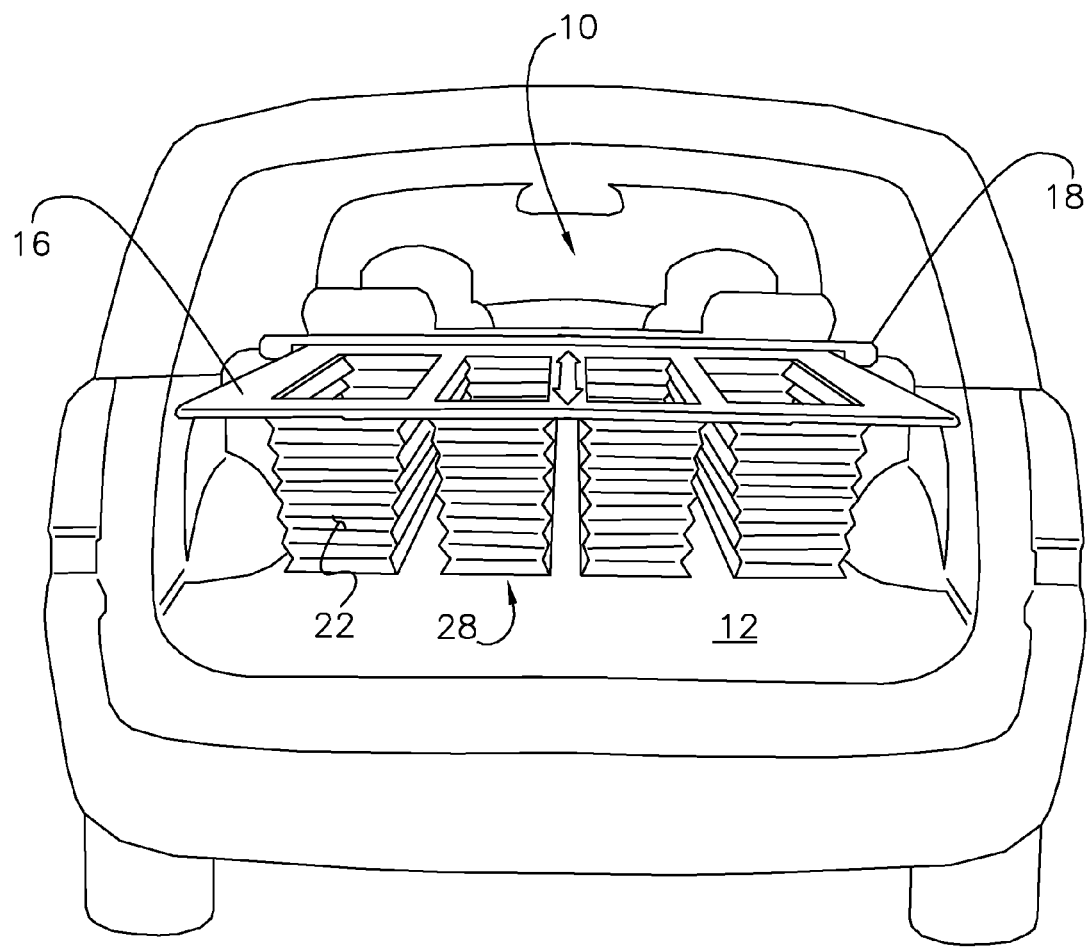
FIG. 3 is a rear perspective view of a bed defined by a pickup truck, and overlaid by a bed cover having a plurality of collapsible storage bins, in accordance with a preferred embodiment of the invention.
Figure 4A:
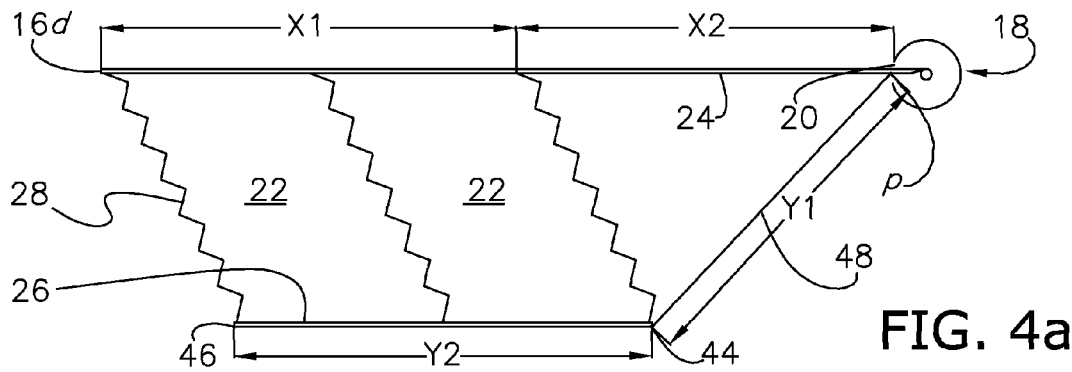
FIG. 4a is a schematic elevation of a cover defining a planar sheet, a plurality of collapsible bins, a retraction mechanism defining a stowage region, and a guide strap connected to the sheet and bins, particularly illustrating spatial distancing between a connection point, the distal cover edge, and the nearest and furthest edges of the bins.
Figure 4B:
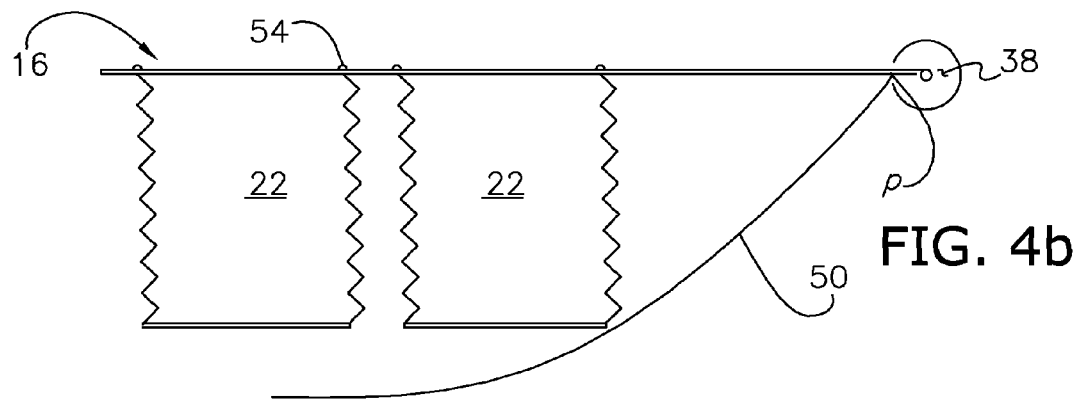
FIG. 4b is a schematic elevation of a cover defining a planar sheet, a plurality of collapsible bins, a retraction mechanism defining a stowage region, and a guide arm disposed beneath the bins and operable to cause the bins to collapse, as the cover is stowed.
Figure 4C:
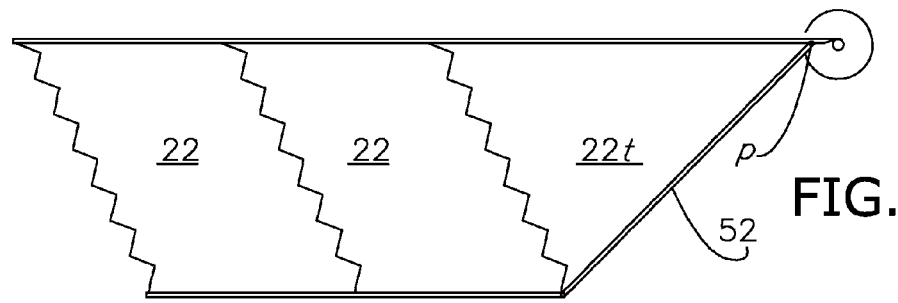
FIG. 4c is a schematic elevation of a cover defining a planar sheet, a plurality of collapsible bins, a retraction mechanism defining a stowage region, and including a triangular bin adjacent the region.
Figure 4D:
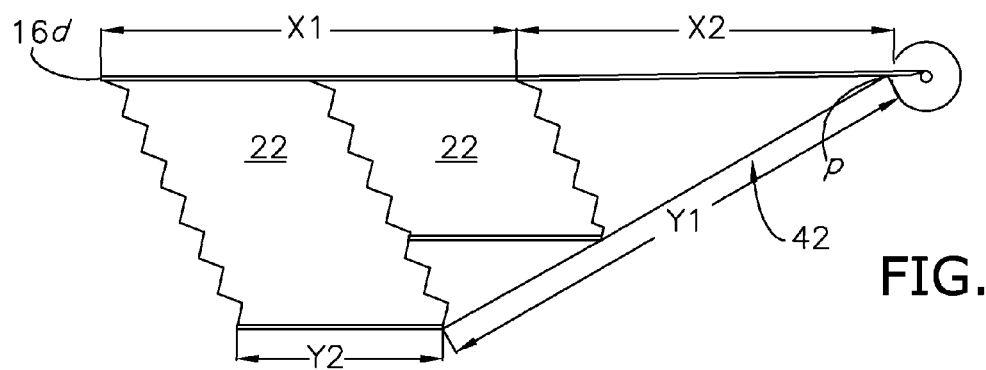
FIG. 4d is a schematic elevation of a cover defining a planar sheet, a plurality of collapsible bins having differing depths, a retraction mechanism defining a stowage region, and particularly illustrating spatial distancing between a connection point, the distal cover edge, and the nearest and furthest edges of the bins.

As shown in FIGS. 3-4d, the collapsible wall 28 may present an accordion-type structure, wherein folds within the wall 28 enable it to achieve a maximum depth where the folds define 180° angles ("straight wall" configuration) and a minimum depth where the folds define 0° angles. Alternatively, and as shown in FIG. 5, the wall 28 may present a telescoping structure, wherein a plurality of annular wall segments 32 slidably inter-engage. Each segment 32 may, more particularly, define a male prong 34 and/or slot 36 configured to receive the adjacent segment prong 34.

The retraction mechanism 18 is operable to selectively cause a deployed cover 10 to stow into a stowage region 38 defined thereby (FIGS. 4a-d); however, it is certainly within the ambit of the invention for the mechanism 18 to also serve as a deployment mechanism, wherein an electromechanical, pneumatic, or active-material based actuator (also not shown) is further included. Where the mechanism 18 includes a scroll, it is appreciated that the bins 22 must also be formed of pliable or flexible material in order to be wound about the scroll with the sheet 16.

Figure 6:
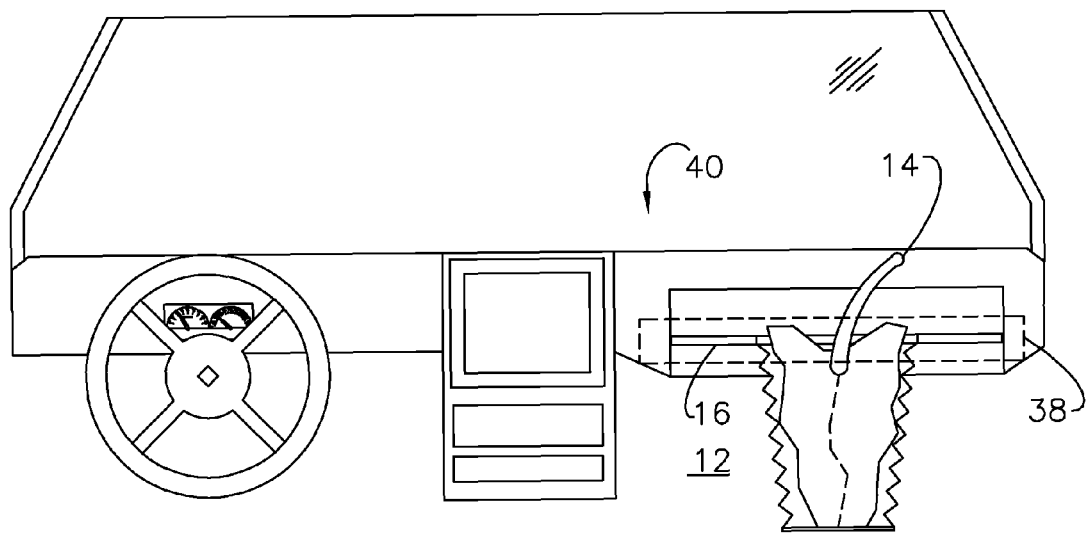
FIG. 6 is an elevational view of a vehicular instrument panel and a cover defining a planar sheet, and a collapsible storage bin in use therewith, according to a preferred embodiment of the invention.

The mechanism 18 may present a stand-alone apparatus, or may be incorporated into the host carrier, as shown in the instrument panel embodiment of FIG. 6. In this configuration, the cover 10 is stowed within a region defined by the instrument panel 40, and where deployed is configured to overlay the space 12 above the front passenger seat cushion and floorboard. A singular collapsible bin 22 is shown in FIG. 6, and sized specifically to retain a woman's purse 14. More preferably, the cover 10 and bin 22 in this configuration can be tilted towards, so as to expose the purse 14 and its contents to, the driver.

Thus, in the deployed condition, the sheet 16 defines a distal cover edge 16d, relative to the region 38 (FIG. 4a). To facilitate stowage, the cover 10 preferably includes a guide 42 configured to gradually engage, so as to automatically cause the bins 22 to collapse, as the cover 10 is being stowed within the region 38. That is to say, the guide 42 converts the lateral translation of the cover 10 towards the opening 20 (FIG. 4a) into the vertical translation of the extended bin(s) 22.

In FIG. 4a, first and second longitudinally adjacent bins 22 are extended, so as to define nearest and furthest bin edges 44,46 relative to the region 38. The guide 42 presents a diagonally oriented strap 48 fixedly connected to the sheet 16 near the opening 20 and to the nearest bin edge 44. The strap 48 may continue to the furthest edge 46, or the bins 22 may be attached so that upward force acting upon the nearest bin edge 44 causes each of the bins 22 to collapse. More particularly, as the strap 48 engages the opening 20 and is caused to flatten in orientation, the bottom panel(s) 26 of the engaged bins are pulled upward.

In FIG. 4b, the guide 42 presents an arm 50 connected to the sheet 16 at a connection point, p, and cantilevered therefrom towards the distal cover edge 16d, so as to present a distal arm end disposed beneath the extended bins 22. As the cover 10 is retracted into the stowage region 38, the arm 50 is lifted, thereby, causing the bins 22 to also lift, as their bottom panels 24 are engaged by the arm 50. As such, the arm 50 preferably presents a length at least equal to the lateral distance between p and the furthest bin edge 36. The arm 50 is preferably formed of a thin flexible plastic, or other rigidly flexible material, so that the arm 50 is stiff enough to collapse the bins 22, but when stowed is able to be wound about the scroll.

In FIG. 4c, the guide 42 is replaced by a triangular bin 22t defined by a sloped bottom panel 52 pivotably connected to the sheet 16 and extending towards the other bins 22. More particularly, the sloped bottom panel 52 extends to an accordion-type wall commonly employed by the triangular and adjacent bins 22. The sloped panel 52 acts similar to the strap 48 and arm 50, and may be further pivotably connected to the bottom panel 26 of the adjacent bin 22, so that as it is caused to rotate towards a horizontal collapsed position, the other bins 22 are likewise caused to collapse.

Whether a guide strap 48, arm 50, or triangular bin 22t is utilized, the bins 22 and sheet 16 are cooperatively configured so as to enable the cover 10 to be retracted and the bins 22 simultaneously collapsed. As such, it is appreciated that where a first longitudinal distance (X1+X2) is defined between p and the distal cover edge 16d, a second longitudinal distance (Y1+Y2) not greater than the first is defined from p to the nearest bin edge 34 (Y1) and then to the furthest bin edge 36 (Y2). The maximum strap length, for example, is determined based on this relationship. It is also appreciated that the maximum bin depth may be extended, while maintaining this relationship, by decreasing the depth of intermediate bins 22, as shown in FIG. 4d. Where the outer bin 22 is positioned adjacent the distal cover edge 16d, the relationship is maintainable by tilting the bins 22 away from the retracting mechanism 18, such that the bottom panels 26 of the bins 22 are closer to the mechanism 18 than the uppermost sections of the bins 22 (FIGS. 4a-d).

As previously mentioned, the bins 22 may be removably connected to the sheet 16, so as to be detached and interchangeably replaced by another bin 22, at the user's discretion. More preferably, in this configuration, a seal 54 (FIG. 4b) inter-engages the interface defined by the sheet 16 and bin(s) 22, so as to prevent the migration of fluids and particulate matter through the interface and into the space 12.

It is appreciated that where a plurality of detachable or fixed bins 22 is provided, each bin 22 may present a variance in at least one characteristic, such as configuration, orientation, scale, depth, material composition, permeability, or color, so as to increase the functionality of the cover 10, and accommodate a greater variety of items 14. Finally, it is also within the ambit of the invention for an adjustable bin 22 to be utilized, wherein the bin 22 presents variable dimensions (e.g., depth, upper and lower cross-sectional area, etc.).

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A cover employable to protect a space and secure at least one item, said cover comprising:

at least one planar sheet presenting a minimum lateral surface area operable to overlay the space; and at least one storage bin securely connected to said at least one sheet and defining a minimum volume related to the item, said bin being configurable between a collapsed condition, wherein the bin is withdrawn from the space, and an extended condition, wherein the bin extends within the space and forms a container configured to retain the item, when the cover is employed, wherein said at least one bin includes a bottom panel and a collapsible wall interconnecting the panel and sheet, and the wall presents a telescoping structure.

2. The cover claimed in claim 1, wherein said at least one sheet defines a cover perimeter and thickness, said at least one bin is spaced from the perimeter, includes a bottom panel, and defines a collapsed thickness equal to the cover thickness, and the panel and sheet cooperatively define a continuous planar surface when the bin is in the collapsed condition.

3. The cover claimed in claim 1, wherein the wall presents an accordion-type structure.

4. The cover claimed in claim 1, wherein a plurality of bins are connected to the sheet.

5. The cover claimed in claim 4, wherein the bins differ in a characteristic selected from the group consisting of configuration, orientation, scale, depth, material composition, permeability, and color.

6. The cover claimed in claim 1, wherein said at least one bin is removably connected to the sheet, so as to be detached and replaced by another bin, and a seal inter-engages the sheet and bin, so as to prevent the migration of matter into the space, when the cover is employed.

7. A cover employable to protect a space and secure at least one item, said cover comprising:

at least one planar sheet presenting a minimum lateral surface area operable to overlay the space;

at least one storage bin securely connected to said at least one sheet and defining a minimum volume related to the item, said bin being configurable between a collapsed condition, wherein the bin is withdrawn from the space, and an extended condition, wherein the bin extends within the space and forms a container configured to retain the item, when the cover is employed; and a retraction mechanism operable to selectively deploy and stow the cover from a stowage region, wherein said at least one sheet defines a distal cover edge relative to the region, when the cover is deployed.

8. The cover claimed in claim 7, further comprising:

a guide element configured to gradually engage, so as to automatically cause to retract said at least one bin, as the cover is stowed within the region.

9. The cover claimed in claim 7, wherein said at least one bin defines nearest and furthest bin edges relative to the region, a first longitudinal distance is defined between the region and distal cover edge, and a second longitudinal distance not greater than the first is defined from the region to the nearest bin edge and then to the furthest bin edge.

10. The cover claimed in claim 9, wherein at least one of said at least one bin is adjacent the distal cover edge, and said at least one bin defines an uppermost bin section, a bin wall, and a bottom panel, and the bin wall slopes away from the region such that the bottom panel is closer to the region than the uppermost section.

11. The cover claimed in claim 9, wherein a triangular bin is defined adjacent the region.

12. A cargo shade adapted for use with a vehicle defining a cargo space having an uppermost cross-sectional area, and to protect and to secure at least one item within the space, said shade comprising:

at least one planar sheet presenting a lateral surface area congruent to the cross-sectional area, and operable to securely overlay at least a portion of the space, said sheet including at least one storage bin, and a remainder section securely connected to said at least one bin, said at least one bin including a bottom panel and collapsible wall configurable between a retracted condition, wherein the bin is completely withdrawn from the space and the panel forms a continuous planar surface with the remainder section, and an extended condition, wherein the bin extends within the space and forms container configured to retain the item; and a retraction mechanism operable to selectively stow said at least one bin and remainder section, wherein said at least one bin and remainder section are formed of soft material, so as to be facilely rolled about the scroll.

13. The cover claimed in claim 12, wherein the space is defined by a truck bed having a constant bed width, and said at least one sheet defines a lateral width congruent to the bed width.

14. The cover claimed in claim 12, wherein the space is defined by a truck bed having a constant bed depth, and each of said at least one bin presents a depth in the deployed condition not greater than the bed depth.

15. The cover as claimed in claim 14, wherein each of said at least one bin presents a depth in the deployed condition not greater than seventy-five percent of the bed depth.

* * * * *